Figure 1:
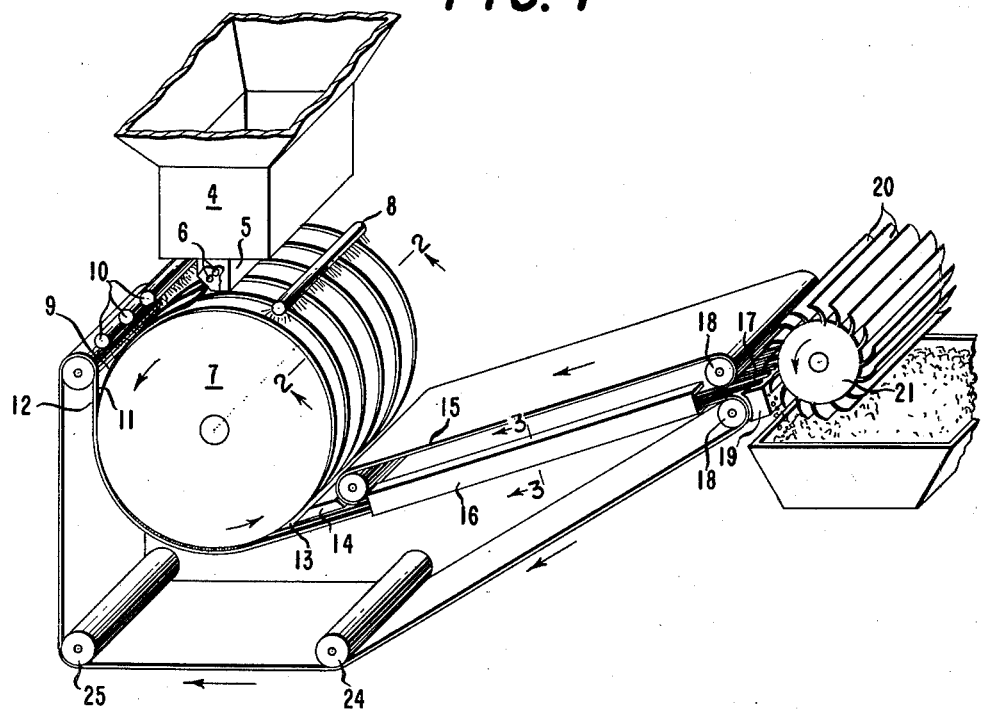

Feb. 12, 1963  R. L. WASHBURN  3,076,999
EXTRUSION AND BEAD CUTTING MACHINE
Filed April 25, 1960  2 Sheets-Sheet 1

INVENTOR
ROBERT LATHAM WASHBURN

BY Earl L. Tyner Jr.
ATTORNEY

Feb. 12, 1963 R. L. WASHBURN 3,076,999
EXTRUSION AND BEAD CUTTING MACHINE
Filed April 25, 1960 2 Sheets-Sheet 2

INVENTOR
ROBERT LATHAM WASHBURN

BY *Earl L. Tyner Jr.*

ATTORNEY

United States Patent Office 3,076,999
Patented Feb. 12, 1963

3,076,999
EXTRUSION AND BEAD CUTTING MACHINE
Robert Latham Washburn, Vienna, W. Va., assignor to
E. I. du Pont de Nemours and Company, Wilmington,
Del., a corporation of Delaware
Filed Apr. 25, 1960, Ser. No. 24,418
2 Claims. (Cl. 18—1)

This invention relates to an apparatus for casting, cooling and cutting a thermoplastic, and more particularly to an apparatus which cools strands of a plasticated polymer emerging from a die and automatically conducts the strands at high speed to a cutting machine.

In the past, two principal methods have been used to produce granulated thermoplastics. One such method consists of extruding filaments or beads of thermoplastics and subsequently cooling and cutting these beads of various cross-sections into short lengths. This type of operation, sometimes termed "spaghetti extrusion," is generally applied to operations which require a low volume of throughput in substantially continuous extrusion and, in general, is not well suited for high volume intermittent operation. Another method for producing granulated polymer which is adaptable to high volume intermittent operations consists of extruding a wide ribbon of molten polymer, solidifying the polymer by contact with a coolant and thereafter passing the ribbon into a cutter where it is reduced to pellets. The granulation obtained by this process is somewhat inferior to that of the spaghetti extrusion process in that the amount of undesirable, irregular particles is increased. In addition, the heat transfer to the ribbon is lower than the heat transfer to individual strands of the thermoplastic and some thermal or oxidative degradation of the polymer can occur in this process.

It is an object of this invention to provide an apparatus for continuous manufacture from the molten plastic of pellets of thermoplastic material which are uniform in particle size and which may be produced at rates far exceeding those of the processing operations of the prior art. It is especially an object of this invention to provide a high speed apparatus for the continuous extrusion, quenching, and cutting of nylon into uniform pellets. It is a further object of this invention to provide an apparatus which may extrude, quench, and cut a molten thermoplastic material with such a speed as to markedly reduce the opportunity for thermal and oxidative degradation thereof, and improve the appearance of the pellets, and permit increased equipment utilization due to the high production rate. Still another object of this invention is to provide an apparatus which quenches strands of a molten polymer and feeds the strands to a cutter without hand manipulation of the strands. Still another object of this invention is to provide an apparatus which may be used to draw a strand or strands of thermoplastic material as the strand is being cooled by a suitable means.

The above objects are accomplished by providing an apparatus for pelleting a molten thermoplastic which contains an endless primary surface with a plurality of endless, non-interconnecting grooves of substantially constant cross-section disposed along the long axis of the primary surface with a suitable means provided for advancing the primary surface and a means for introducing at least one strand of the molten thermoplastic into a groove on the primary surface in the direction of advancement thereof. A means, such as a water spray, is provided to cool the strand in the groove. An additional conveyor system with an endless secondary surface of substantially the same width as the primary surface is provided. The secondary conveyor is advanced at the same speed and direction as the primary surface and is contiguous with the primary surface from a location beyond the point of introduction of the strand or strands into the grooves to the desired point of removal of the strand from the groove. Throughout their contiguous relationship, the primary and secondary surfaces retain the strands in the grooves. Either the primary or secondary surface directs the strands to a device for transversely cutting the strands into pellets. If desired, a stripper plate may be provided to assure removal of the strands from the grooves in the surface. This plate is usually located adjacent to the desired point of removal of the strands and fits the grooved contour of the surface. In the preferred embodiment of this invention, the edges of the traveling surfaces or conveyors are enclosed, elevated or held together throughout the contiguous relationship of the surfaces to prevent the strands from escaping from between the surfaces before reaching the cutter and retain a coolant between the surfaces.

Figure 2:
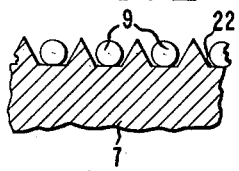
Figure 3:
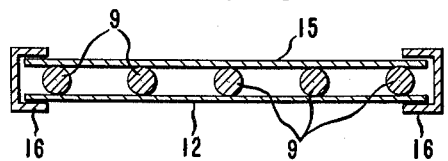
Figure 4:
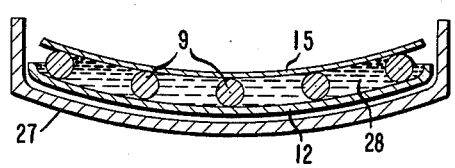
Figure 5:
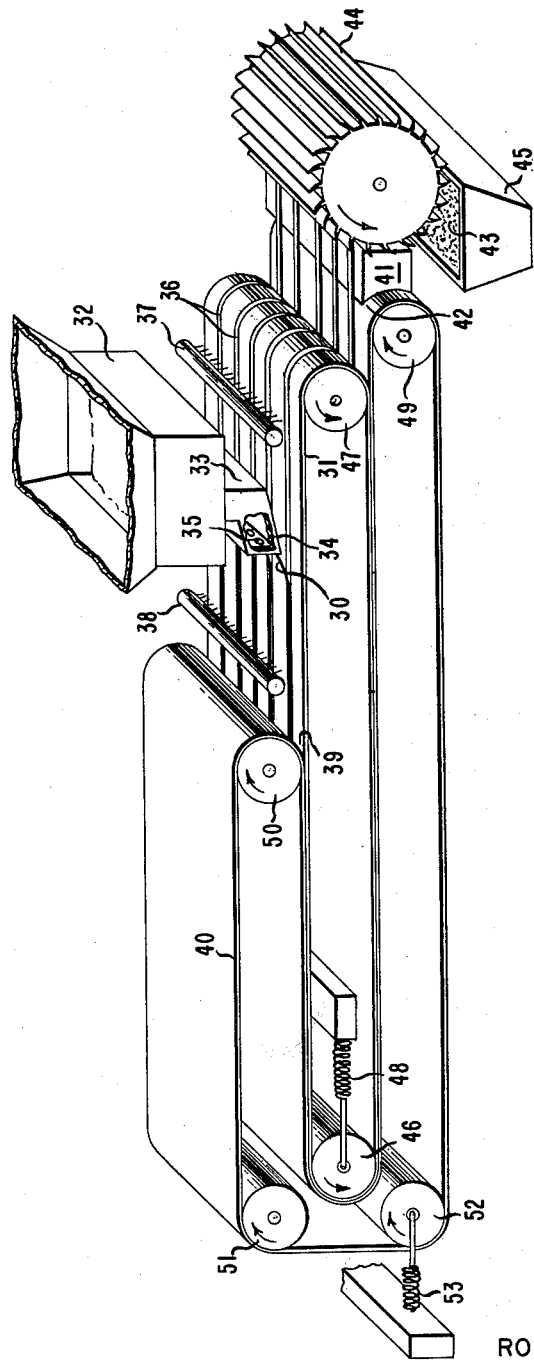

A more complete understanding of the features of this invention may be had by referring to the drawings attached hereto, and made a part of this specification. FIGURE 1 is an oblique side view of the apparatus of this invention embodying the features to be described hereinafter. FIGURE 2 is a partial cross-section taken along the lines 2—2 of FIGURE 1. FIGURE 3 is a cross-sectional view taken along the lines 3—3 of FIGURE 1. FIGURE 4 is a cross-sectional view showing an alternate arrangement for retention of the strands at the same location as FIGURE 3. FIGURE 5 is an oblique side view of a modification of the apparatus of FIGURE 1.

By reference to FIGURE 1, the general configuration of the apparatus of this invention can be seen. The source of the molten thermoplastic is the hold-up reservoir 4 which is usually an autoclave or other type of bulk reservoir, but may be an extruder. From the reservoir 4, the thermoplastic passes through a die comprising the nozzle 5 and the openings 6. Usually the openings 6 in the nozzle 5 are situated on a straight line and each hole is located over the center line of the corresponding groove (item 22 of FIGURE 2) on the cylinder 7. The extrusion holes may be round, square, cusp-shaped, or any other configuration, depending upon the desired cross-section of the pellets being produced. As the strands or rods 9 emerge from the openings 6, they are directed towards the grooved cylinder 7 and in the direction of rotation thereof (shown herein as counterclockwise), by virtue of the location of the openings 6 in the nozzle 5. This technique minimizes the undesired movement of the rods. The curved surface of the cylinder has been wetted by the coolant distributor 8 and the strands or rods 9 follow the rotation of the cylinder 7 and pass under additional coolant distributors 10 to which is normally supplied sufficient liquid coolant to flood the grooves, thus increasing the cooling efficiency of the device. While the liquid coolant may, in general, be any inert, high boiling liquid which does not corrode the equipment or dissolve the thermoplastic strands, it is usually convenient and economical to use water as the coolant. The stream of coolant tends not only to direct the strands onto the wheel, but also aids in holding them against the curved surface before they are covered by the belt 12. At point 11, a primary continuous conveyor or belt 12 is brought into contact with cylinder 7 for the purpose of covering strands 9 and securing them in the grooves of the cylinder. The primary conveyor 12 usually runs at the same speed as the peripheral speed of the grooved cylinder 7 and remains in contact with the cylinder up to location 13 where the strands 9 separate from the wheel as a result of strand stiffness and tension combined with centrifugal and gravitational forces. To assure the removal of strands 9 from the cylinder 7, a stripper plate 14 may be provided which is disposed adjacent to the cylinder. As mentioned above, the end of the stripper plate 14 has a configuration which mates with the curved surface of cylinder 7 in the same sense that two components of a threaded connection, or two intermeshing gears mate with each other. The strands 9, after leaving the rotating cylinder, are covered with a secondary belt 15 which, under normal conditions, travels at the same speed as the primary belt or conveyor 12, thus sandwiching the strands 9 between the belts 12 and 15 and conveying the strands away from cylinder 7. Two U-shaped channels 16 (also shown in FIGURE 3), will prevent the strands 9 from escaping sideways from between the two belts and also serve to retain coolant between the belts to aid in cooling the strands. Coolant may also be retained about the strands by employing tapered rolls which hold the edges of the belts together and thus form a pocket between the belts. Coolant can also be retained about the strands by the alternate device shown in FIGURE 4. Suitable devices, such as spring loads on rollers 24 and 25, may be employed to retain tension in the belts, and additional rollers may be employed to guide the belts in the desired path. At location 17, both the primary and secondary belts are removed from contact with the strand and pass over the reversing wheels 18. The strands immediately pass over the bed knife 19, and thence to the revolving knives 20 of the cutter rotor 21. The belts should be arranged to discharge the strands very close to the knife edge in order to minimize side movement and bounce of the strands as they are severed. A suitable receptacle 24 is provided for the pellets. Any desired length of pellet may be obtained by synchronizing the speed of the cutter rotor 21 with the speed of the belts 12 and 15. Normally, the cutter discharges wet pellets into the receptacle 24 and these pellets may be dried by conventional methods. However, it is considered within the purview of this invention that suitable air jets may be used in, or around, location 17 to blow excessive moisture away from the strands, as the strands leave the primary and secondary belts. Suitable wiping means may also be used in addition to, or in place of, the air jets.

FIGURE 2 is a partial cross-section along the line 2—2 of FIGURE 1, showing one possible arrangement of the grooves in the curved surface of the cylinder 7. Strands 9 have been added to aid in the description. The grooves 22 are usually sized so that a strand 9, lying in the groove, will not project above the outer surface of the cylinder, but will permit the conveyor 12 (as shown in FIGURE 1) to form a snug closure for the strand without deforming it. In this particular illustration the grooves 22 have flat bottoms and straight sides; however, the design of the groove is not a critical feature of this invention and, therefore, the grooves may be of any desired configuration.

FIGURE 3 is a cross-sectional view along the line 3—3 of FIGURE 1. In this figure the strands 9 are sandwiched between the primary conveyor 12 and secondary conveyor 15. The U-shaped end channels 16 extend along the entire length of the cooperative action of the primary and secondary conveyors and prevent the strands 9 from slipping sideways out of contact between the conveyors.

FIGURE 4 shows an alternate and equally effective arrangement to contain the strands 9 between the belts 12 and 15. For purpose of illustration FIGURE 4 is a cross-section taken at line 3—3 of FIGURE 1. A single U-shaped supporting trough 27 located beneath the lower surface of belt 12 retains both belts 12 and 15 as a suitable coolant 28. The trough 27 extends along a major portion of the entire length of cooperative travel of the primary conveyor 12 and the secondary conveyor 15.

FIGURE 5 is an oblique sideview of a modification of the present invention which utilizes a grooved belt in place of the cylinder 7 of FIGURE 1. The means for directing strands 30 onto the grooved belt 31 is similar to that shown in FIGURE 1 and comprises a holdup reservoir 32 and a die 33. The die is composed of nozzles 34 and openings 35 arranged substantially as described in FIGURE 1. The grooves 36 in belt 31 may have the same cross-sectional configuration as the grooves on the cylinder as set forth hereinabove. A coolant distributor 37 wets the surface of belt 31 prior to the deposition thereupon of strands 30. An addiitonal coolant distributor 38 is provided to further wet the stands as they follow the movement of belt 31. At point 39, a conveyor belt 40, traveling at substantially the same speed as belt 31, is brought into cooperative action with belt 31 and covers the strands residing in grooves 36. The conveyor 40 remains in contact with the strands until they are released to the bed knife 41 at location 42 where the strands are cut into pellets 43 by a rotating cutter 44 and collected in a suitable receptacle 45 for additional processing, if desired. A reversing roll 46 is placed as shown to effect a 180° turn of the belts 31 and 40. Since the grooved belt 31 is in the upper position while the strands are directed towards the cutter it may be advantageous to provide coincident grooves on belt 40 for adequate retention of the strands. In most cases this specific modification is unnecessary. If additional means of retention is needed during the cooperative travel of belts 31 and 40, channels 16 as shown in FIGURE 1 may be employed. A stripper plate (not shown) mating with the surface configuration of belt 31 may be placed at location 42 to assure removal of strands therefrom. Normally, a stripper plate is not required prior to bed knife 41 at location 42 since the strands readily separate from the belt. Reversing rolls 46 and 47 are provided for guidance of belt 31 with a suitable means, such as the spring device 48, to maintain tension on that belt. Reversing rolls 49 and 50 and guide rolls 51 and 52 are shown for belt 40 with the tension on the belt being controlled by a suitable means such as the spring device 53 attached to roll 52. A driving means for belts 31 and 40 may be connected to any one of the above-mentioned rolls. The general comments with respect to operation of this device remain substantially as set forth in the comments relating to the device shown in FIGURE 1.

In the preferred embodiment of this invention, the width of the primary and secondary conveyors is substantially equal to the width of the cylinder surface and the arrangement of the lands and grooves on the curved surface of the cylinder may be a series of triangles as shown in FIGURE 2 with flat-bottomed grooves therebetween, or, if desired, may be a series of V-shaped lands and grooves with no flat surface between each land, or any other desirable shape. The arrangement and the cross-sectional configuration of these lands and grooves will generally depend upon the desired cross-section of the strand being cooled and cut. Maximum cooling of the strands is obtained by filling the grooves with coolant prior to directing the strands therein with additional coolant being added after the strands have been directed into the grooves. The coolant is retained in contact with the strands by methods described hereinabove.

The apparatus of this invention, unlike those of the prior art, does not require the constant attention of an operator. The prior art, in attempting to obtain a small particle size which is desired in the trade, required that the machines be run extremely slowly because breaks occur in individual strands from time to time and the strand following the break must be rethreaded into the cutter. It is obvious that the linear speed of the strands, and thus the mass rate of strand cutting, had to be limited by the dexterity of the operator. Generally, manual threading limited the strand movement to a maximum speed of about 4 feet per second; thus, prior to this invention, the rate of pelleting could only be increased by increasing the number of machines or the number of strands per machine. Multiple strands on one machine led to complicated die designs, and considerable difficulty in maintaining uniformity in the final particle size, and even more difficulty in manual rethreading of broken strands. The apparatus of this invention not only increases the number of strands, but also makes it possible to increase the strand speed by providing a machine which is self-threading and not limited by human dexterity. With the machine of this invention, mass rates of pellet production are in excess of a five-fold increase over machines of prior art. Strand speeds of 12 feet per second are easily obtained, and higher strand speeds are attainable. The uniformity of the beads produced by the present device is excellent. The uniformity may be further improved by the employment of high draw ratios to which this device is readily adaptable. The term "draw ratio," as used herein, refers to the ratio of the area of the cross-section of the die opening or initially extruded strand to the area of the cross-section of the final pellet. At the high linear speeds of strand movement obtained by this invention, which are hitherto unknown in plastic processing equipment, no manual handling of the polymer is required regardless of the location of the strand break. The instant invention is operable to produce pellets in the usual sizes, e.g. from $\frac{1}{16}''$ to $\frac{3}{16}''$, although it is possible to obtain any size of pellets by regulating the speeds of the various parts of this device. In addition to the improved appearance of the pellets produced by the instant invention, it has been found that the rapid, uniform quenching achieved herein reduces the opportunity for thermal or oxidative degradation of the plastic, and yields pellets having a uniform macromolecular structure. Thus, the apparatus of this invention fulfills a long-felt need in the commercial processing of thermoplastic polymers.

I claim:

1. An apparatus for pelleting a molten thermoplastic comprising a cylinder with a plurality of endless, non-inter-connecting grooves of substantially constant cross-section located on the curved surface thereof, a means for rotating said cylinder about its axis, a means for introducing each strand of a plurality of strands of said molten thermoplastic into a groove on said cylinder, a means for cooling said strand in said groove, and a conveyor system for directing said strand to a means for transversely cutting said strand into pellets; said conveyor system comprising a continuous primary conveyor and a continuous secondary conveyor each having substantially the same width and that width being at least as great as the overall axial length of the grooved portion of the surface of said cylinder; both of said conveyors traveling at substantially the same speed as the peripheral speed of said cylinder; said primary conveyor being contiguous with said curved surface from a location immediately beyond the point of introduction of said strand into said groove in the direction of rotation of said cylinder to a desired point of removal of said strand from said groove; said secondary conveyor cooperating with said primary conveyor by holding said strand between said conveyors from said point of removal to the entrance to a means for transversely cutting the strand into pellets, and a means for enclosing the opening between the corresponding edges of said conveyors from said point of removal to said entrance.

2. An apparatus for pelleting a molten thermoplastic which comprises an endless primary conveyor having a plurality of endless, non-interconnecting grooves of substantially constant cross section disposed along the long axis thereof, a means for advancing said primary conveyor, a means for introducing each strand of a plurality of strands of said molten thermoplastic into a groove on said primary conveyor in the direction of advancement thereof, a means for cooling said strand in said groove and a secondary conveyor operating in conjunction with said primary conveyor for restraining and directing said strand to a means for transversely cutting said strand into pellets; said secondary conveyor having substantially the same width as said primary conveyor that width being at least as great as the overall axial width of the grooved portion of said primary conveyor and being advanced at the same speed and in the same direction as said primary conveyor by a suitable means; said secondary conveyor being contiguous with said primary conveyor from a location immediately beyond the point of introduction of said strand into said groove to the desired point of removal of said strand from said groove, holding said strand in said groove and finally restraining and directing said strand to a location immediately adjacent to said cutting means and a means for enclosing the cooperating edges of said primary conveyor and said secondary conveyor through the contiguous relationship of those conveyors.

References Cited in the file of this patent

UNITED STATES PATENTS

| | | |
|---|---|---|
| 2,068,181 | Hurxthal | Jan. 19, 1937 |
| 2,582,294 | Stober | Jan. 15, 1952 |
| 2,847,701 | Welch | Aug. 19, 1958 |

UNITED STATES PATENT OFFICE
CERTIFICATE OF CORRECTION

Patent No. 3,076,999                                        February 12, 1963

Robert Latham Washburn

It is hereby certified that error appears in the above numbered patent requiring correction and that the said Letters Patent should read as corrected below.

Column 3, line 67, after "as" insert -- well as --.

Signed and sealed this 3rd day of September 1963.

(SEAL)
Attest:

ERNEST W. SWIDER                                      DAVID L. LADD
Attesting Officer                                         Commissioner of Patents